(12) United States Patent
Bergogne

(10) Patent No.: US 11,056,971 B2
(45) Date of Patent: Jul. 6, 2021

(54) VOLTAGE STEP-DOWN CONVERTER

(71) Applicant: Commissariat à l'Energie Atomique et aux Energies Alternatives, Paris (FR)

(72) Inventor: Dominique Bergogne, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/450,908

(22) Filed: Jun. 24, 2019

(65) Prior Publication Data

US 2019/0393781 A1  Dec. 26, 2019

(30) Foreign Application Priority Data

Jun. 25, 2018 (FR) ...................................... 1855674

(51) Int. Cl.
*H02M 3/156* (2006.01)
(52) U.S. Cl.
CPC .................................. *H02M 3/156* (2013.01)
(58) Field of Classification Search
CPC ...... H02M 3/155; H02M 3/156; H02M 3/157; H02M 3/158
See application file for complete search history.

(56) References Cited

U.S. PATENT DOCUMENTS

| | | | |
|---|---|---|---|
| 7,254,000 B1* | 8/2007 | Smith | H02H 7/1213 323/224 |
| 7,969,127 B1 | 6/2011 | Megaw | |
| 8,552,698 B2 | 10/2013 | Chow | |
| 10,686,381 B1* | 6/2020 | Zhang | H02M 3/1588 |
| 2001/0019258 A1* | 9/2001 | Frohler | H02M 3/156 323/222 |
| 2002/0125871 A1* | 9/2002 | Groom | H02M 3/156 323/284 |
| 2008/0080219 A1* | 4/2008 | Sohma | H02M 3/1588 363/89 |
| 2009/0027027 A1* | 1/2009 | Lin | H02M 3/158 323/285 |

(Continued)

FOREIGN PATENT DOCUMENTS

DE   3545323 A1   6/1987

OTHER PUBLICATIONS

A. Garrigos et al., "A new Sequential Switching Shunt Regulator—Digital Shunt Regulator (S3R-DSR) for Solar Array Regulators," 2006 IEEE International Symposium on Industrial Electronics (ISIE 2006), Jul. 9-12, 2006, 6 pages.

(Continued)

*Primary Examiner* — Thienvu V Tran
*Assistant Examiner* — Ivan Laboy
(74) *Attorney, Agent, or Firm* — Moreno IP Law LLC

(57) ABSTRACT

A DC voltage step-down converter, includes at least one first resistive element in series with a first switch between a first terminal and a second terminal of application of a first DC voltage; and a capacitive element between a third terminal and a fourth terminal for supplying a second DC voltage smaller than the first one, the node between said first resistive element and the first switch being coupled by a diode to said third terminal, said first switch being turned on when the second voltage is greater than a reference voltage of the second voltage.

15 Claims, 2 Drawing Sheets

(56) References Cited

U.S. PATENT DOCUMENTS

| | | | |
|---|---|---|---|
| 2009/0201003 A1* | 8/2009 | Kobori | H02M 3/1582 323/284 |
| 2010/0007407 A1 | 1/2010 | Trajkovski et al. | |
| 2010/0327837 A1* | 12/2010 | Tsugawa | H02M 1/32 323/285 |
| 2011/0074489 A1* | 3/2011 | Viitanen | H02M 1/08 327/427 |
| 2014/0082829 A1* | 3/2014 | Volmer | H02H 9/008 2/410 |
| 2014/0375295 A1* | 12/2014 | Ito | H02M 3/06 323/300 |
| 2015/0162833 A1 | 6/2015 | Phadke | |
| 2015/0311796 A1* | 10/2015 | Dubois | H02M 1/08 323/271 |
| 2019/0028088 A1* | 1/2019 | Belvedere | H02M 1/08 |
| 2019/0109534 A1* | 4/2019 | Okonogi | F02D 41/22 |
| 2019/0199216 A1* | 6/2019 | Hayashi | H02M 1/36 |
| 2019/0265080 A1* | 8/2019 | Awatsu | G01R 31/40 |

OTHER PUBLICATIONS

Preliminary Search Report for French Application No. 1855674 dated Mar. 22, 2019, 2 pages. (Edited to show correct German document number).

\* cited by examiner

VOLTAGE STEP-DOWN CONVERTER

FIELD

The present disclosure generally concerns electronic circuits and, more specifically, power converters.

The present disclosure applies to power converters supplying a DC voltage.

BACKGROUND

Power conversion is a particularly developed field since most electronic systems comprise a power converter.

Converters may be divided into two large categories, switched-mode converters and linear regulators.

In a switched-mode converter, a DC input voltage is cut off by a switch controlled in pulse-width or pulse-frequency modulation. The power is converted by an inductive transformer and the output voltage of the transformer is rectified to supply a DC voltage.

For a voltage step-down conversion with a ratio in the order of one hundred, such converters are bulky due to the significant required transformation ratio. In particular, they are not integrable.

In a linear regulator, an active element (typically a transistor), connected between the input and the output of the converter, is controlled to only give way to part of the power.

For a lowering of the voltage with a ratio in the order of one hundred, and particularly for high input voltages (in the order of 1,000 volts), the leakage current in the regulation transistor(s) is too large for the solution to be industrially realistic.

Document US 2010/0007407 describes a circuit for generating a negative power supply voltage signal, and an associated power supply device and electronic device.

Document DE 3545323 describes a transformer-less power supply device.

SUMMARY

There is a need for a DC/DC power conversion system capable of operating with a significant step-down ratio (greater than 100).

An embodiment provides a voltage converter having a step-down ratio of at least 100 and which is integrable.

An embodiment provides a converter where current leakages have no incidence on the supplied voltage.

An embodiment overcomes all or part of the disadvantages of known voltage converters.

An embodiment provides a DC voltage step-down converter comprising:
  at least one first resistive element in series with a first switch between a first terminal and a second terminal of application of a first DC voltage; and
  a capacitive element between a third terminal and a fourth terminal for supplying a second DC voltage smaller than the first one,
  the node between said first resistive element and the first switch being coupled by a diode to said third terminal, said first switch being turned on when the second voltage is greater than a reference voltage of the second voltage.

According to an embodiment, the converter comprises a hysteresis comparator of the second voltage with respect to said reference voltage, an output of the comparator delivering a control signal for the first switch.

According to an embodiment, said first resistive element introduces a potential difference approximately corresponding to the voltage difference between the first and second voltages.

According to an embodiment, said first resistive element is a resistor.

According to an embodiment, said first resistive element is formed by the on-state drain-source resistance of a MOS transistor.

According to an embodiment, said transistor is a normally—on GaN transistor.

According to an embodiment, the first switch is controlled in all or nothing.

According to an embodiment, said diode is formed of a second controlled switch.

According to an embodiment, the converter comprises a passive component between the switch and said second terminal.

According to an embodiment, the ratio of the first and second voltages is greater than 100.

According to an embodiment, the first voltage is greater than 1,000 volts.

An embodiment provides a method of converting a first DC voltage into a second DC voltage, wherein a charge of a capacitive element is controlled by a first switch controlled by a hysteresis comparator of the first voltage with a reference voltage, said first switch being turned on when the second voltage is greater than a reference voltage of the second voltage.

According to an embodiment, the first switch short-circuits to ground a node of power supply to the capacitive element.

According to an embodiment, a resistive element couples a first terminal of application of the first voltage to said node, said element absorbing the voltage drop between the first and second voltages.

An embodiment provides a power conversion chain comprising a converter.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

Figure 1:
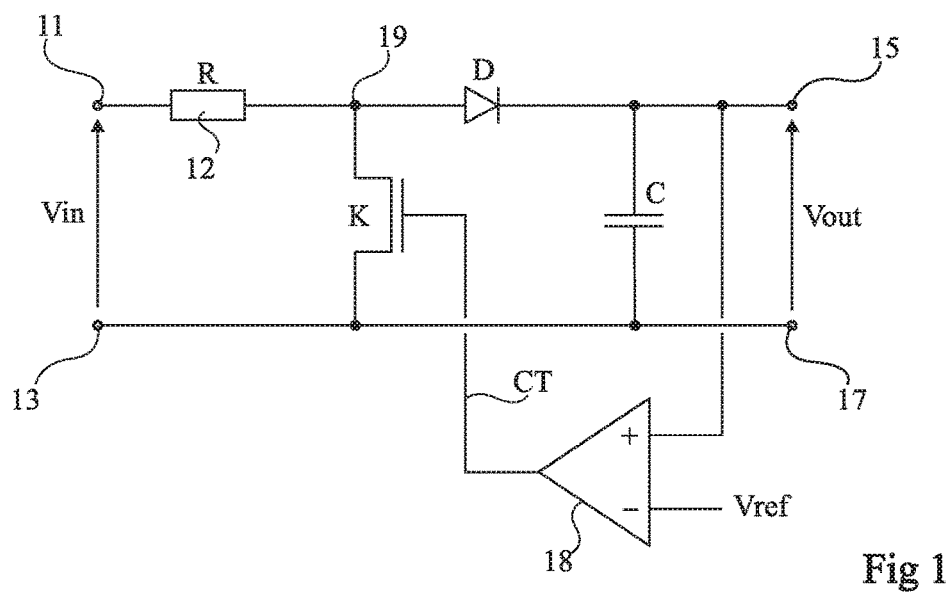
FIG. 1 very schematically shows an embodiment of a voltage converter.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the upstream (power source, power converter, etc.) or downstream (charge, linear converter, etc.) elements have not been detailed, the described embodiments being compatible with usual voltage converter applications.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

The terms "about", "substantially", "approximately", and "in the order of" are used herein to designate a tolerance of plus or minus 10%, preferably of plus or minus 5%, of the value in question.

According to the described embodiments, it is provided to organize the charge of a capacitive element by a switching of switches in all or nothing. Further, it is provided to ensure the voltage drop between the input voltage and the output voltage by means of a resistive element. Such an element may be exclusively formed of passive components, typically a resistor, or be formed of an assembly including a transistor placed in operating conditions capable of creating a dissipative resistive effect, alone or associated with other elements. Preferably, a GaN-type transistor, preferably normally on, having its gate biasing conditions adjusting its on-state drain-source resistance, so that the transistor behaves as a current source, is used. An advantage of such a transistor over a passive resistor is to decrease the power dissipation. The term resistive element excludes a pure inductance or a pure capacitance which, according to the operating conditions, may be in a state when it does not enable the voltage thereacross to drop.

High and low voltage refers to a relative difference with a ratio of at least 100 between the two voltages. In the more particularly targeted embodiments, the high voltage is a voltage of at least 1,000 volts while the low voltage is a voltage in the order of some ten volts, or even of a few volts.

FIG. 1 very schematically shows an embodiment of a voltage converter 1.

Converter 1 comprises:
- two input terminals 11 and 13 of application of a high DC voltage Vin;
- two terminals 15 and 17 for supplying a low DC voltage Vout;
- a resistive element 12, illustrated by a resistor R, introducing a potential difference between terminal 11 and a node 19, coupled to terminal 13 by a first switch K;
- a hysteresis comparator 18 comparing output voltage Vout with a set point or reference voltage Vref and delivering a control signal CT to switch K; and
- a second switch D, typically a diode, between node 19 and terminal 15.

Switches K and D are controlled in all or nothing and complementarily (switch K is on when switch D is off and conversely). According to a preferred embodiment, switch K is formed of a MOS transistor and switch D is formed of a diode (anode on the side of node 19). Thus, switch D is of spontaneous conduction type (when the voltage between terminals 19 and 15 exceeds its conduction threshold) while switch K is controlled by control signal CT.

The signal for controlling switch K is delivered by hysteresis comparator 18. By selecting the reference voltage Vref of comparator 18, the charge of capacitor C around value Vref is controlled with a variation corresponding to the hysteresis of comparator 18. Thus, switches K and D respectively direct the current either towards the ground or towards storage capacitor C, thus enabling to control the capacitor charge.

Comparator 18 is preferably supplied with voltage Vout. Thus, the converter requires no auxiliary power supply for its operation.

The function of switch D is to isolate the positive electrode from capacitor C when switch K short-circuits node 19 to ground. A diode is therefore particularly adapted.

Resistive element 12 introduces the voltage drop necessary to pass from voltage Vin to voltage Vout (to within the voltage drop in diode D in the on state). Accordingly, the components downstream of element 12 need not stand a voltage drop equivalent to the difference between voltages Vin and Vout, the latter being absorbed by element 12. Element 12 preferably is a resistor R. An advantage of using a resistor is that it is easy to size it according to the application and to the desired potential difference between the input and the output.

According to the shown embodiment, the reference potentials of voltages Vin and Vout are the same. Accordingly, terminals 13 and 17 are, in this embodiment, confounded.

According to another embodiment, not shown, element 12 is distributed in two elements or portions (for example, two resistors of same value), one between terminal 11 and node 19, the other between terminal 13 and the connection node of switch K. In this case, the reference potentials of voltages Vin and Vout are different and the potential of terminal 17 becomes the reference potential of the application.

Figure 2:
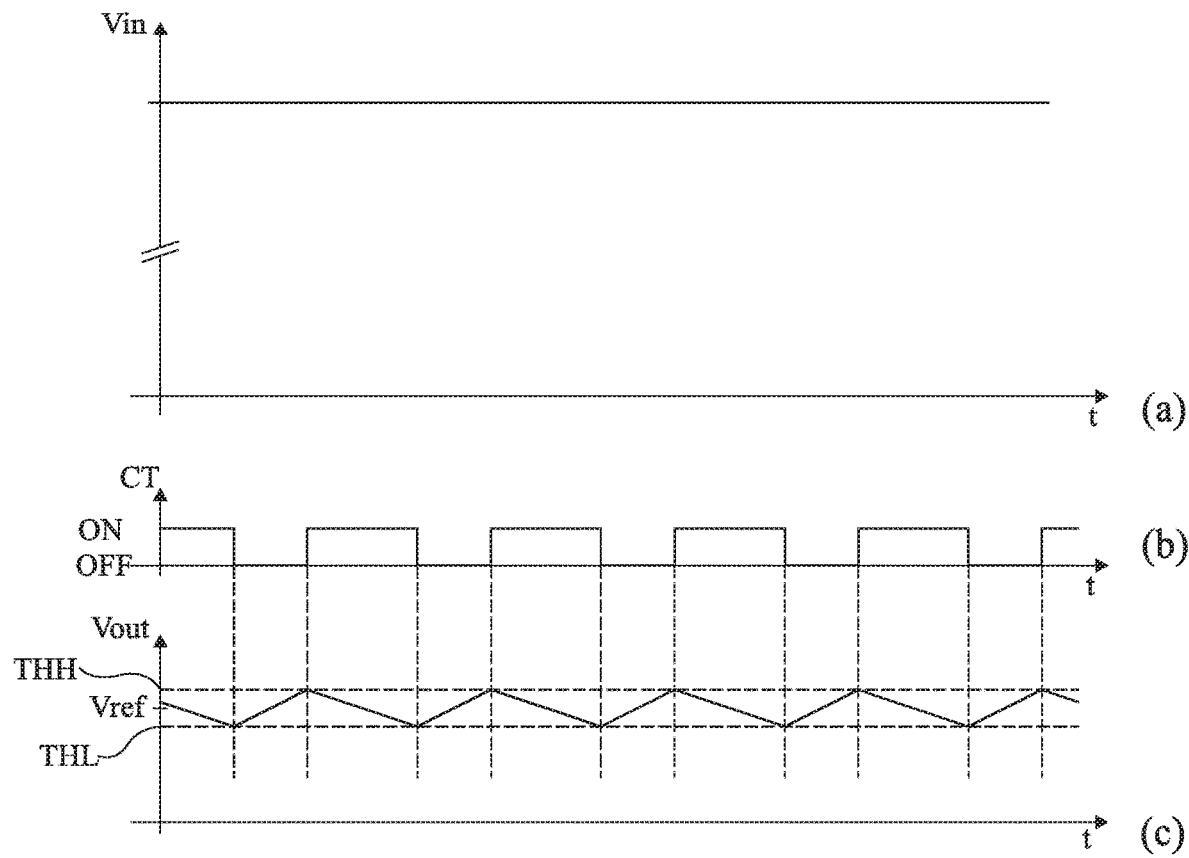
FIG. 2 illustrates, in timing diagrams (a), (b), and (c), the operation of the converter of FIG. 1.

FIG. 2 illustrates, in timing diagrams (a), (b), and (c), the operation of the converter of FIG. 1.

Timing diagrams (a), (b), and (c) respectively illustrate examples of shapes of voltage Vin, of control signal CT, and of voltage Vout. The representations of timing diagrams (a), (b), and (c) are in steady state. At the starting (the powering on of terminals 11 and 13), switch K is off to allow the initial charge of capacitor C and the operation of comparator 18.

The hysteresis of comparator 18 defines two thresholds, respectively an upper threshold THH and a lower threshold THL at voltage Vref, which set the switching levels of comparator 18, and thus the turning on and off of switch K. The difference between thresholds THL and THH is selected according to the variations of voltage Vout which are acceptable by the application. Such a difference conditions the switching rate of switch K. It can thus be seen that the regulation is also performed according to the needs of a load connected between terminals 15 and 17. Indeed, for a given converter, that is, with given R, C components and thresholds THL and THH, the more power the load consumes, the shorter the periods of capacitor discharge or of turning-on of switch K. Conversely, the capacitor charge periods (switch K off) are lengthened.

As compared with a usual linear or switched-mode regulator, the current is here controlled by a branching of the current to ground rather than by an interruption of the current. Thus, the leakage current of switch K carrying out this function does not adversely affect the operation.

The current sampled from the power source applied between terminals 11 and 13 depends on the value of resistor R forming element 12.

An advantage of the described embodiments is that all the active elements (switch K, diode D) need not withstand a significant voltage. They thus only need to be selected according to the current that they can withstand in the on state and which corresponds to the current set by resistor 12.

Thus, the circuit described in relation with FIG. 1 may easily be achieved in the form of an integrated circuit.

An advantage of the described converter is that switches K and D, which are used to conduct the current, operate in all or nothing. The heating is then lighter than that of a linear regulator.

Further, a control in all or nothing (of switch K) is much less power consuming than a power gradation control (variation of the on-state series resistance) as is the case in a linear regulator. The control circuit is thus simplified, as well as the bulk of the final circuit.

It should be noted that, as compared with a shunt regulator where the control signal controls the on-state series resistance of a transistor to deviate a portion of the current to ground, the converter disclosed in the described embodiments has the advantage that switch K is controlled in all or nothing, which simplifies its control. Further, as indicated hereabove, the presence of element 12 which steps down the voltage makes the circuit compatible with an integrated implementation.

An assembly such as described may be used as a device for limiting (or protecting) the level of a stepped-down voltage of a switched-mode converter control circuit. For example, such a solution may be applied to a circuit such as described in patent application FR A 2998735 to provide a protection against overvoltages capable of occurring at high temperature or high input voltage due to the leakage current of a normally-on GaN transistor (J1) no longer performing the low-voltage regulation function.

The switching rate (in the order of one Hertz or of some ten Hertz) of switch K is, in practice, much smaller than that (in the order of some hundred kilohertz) of a switched-mode power supply switch.

Figure 3:
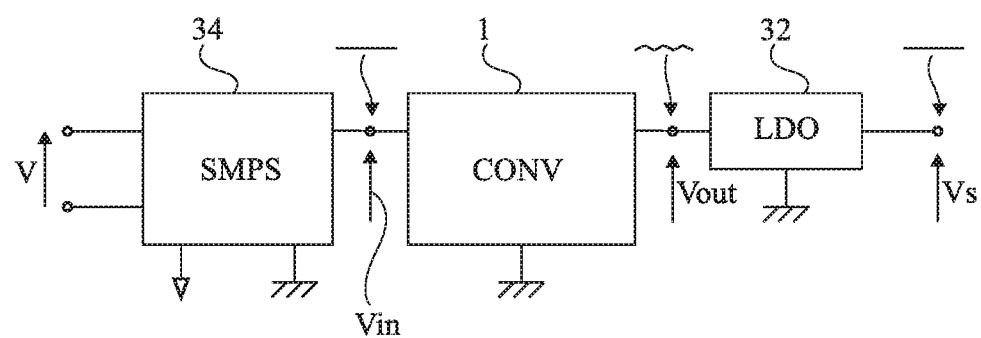
FIG. 3 shows an embodiment of a power conversion chain comprising the converter of FIG. 1.

FIG. 3 shows an embodiment of a power supply chain comprising a converter 1 (CONV) of the type of that described in relation with FIG. 1.

FIG. 3 shows that the described converter may be completed, downstream, with a linear regulator 32 (LDO). Such a linear regulator 32 enables to smooth output voltage Vout and thus to mask the variations of voltage Vout due to capacitive switchings.

Further, upstream of converter 2, a switched-mode power supply 34 (SNIPS) having its input receiving a DC voltage V and having its output supplying a DC voltage may be provided.

FIG. 3 also shows that, concerning the reference potentials of the circuits, the reference potential or ground of voltage V may be different from that of the rest of the application.

Converter 1 is particularly advantageous for high input voltages (from several hundreds to several thousands of volts) and low output voltages (from a few volts to a few tens of volts) and for currents in the order of some ten to some hundred microamperes. The value of resistance R is, in the case of a passive component, for example in the order of one MΩ.

Various embodiments and variations have been described. It will be understood by those skilled in the art that these various embodiments and variations may be combined, and other variations will occur to those skilled in the art. In particular, the selection of the value of capacitor C, of resistor 12, as well as of value Vref, depends on the application. Further, although the described embodiments take the example of voltages Vin and Vout positive with respect to the reference potential of terminals 13 and 17, they easily transpose to the conversion of a negative voltage.

Finally, the practical implementation of the described embodiments and variations is within the abilities of those skilled in the art based on the functional indications given hereabove.

What is claimed is:

1. A DC voltage step-down converter comprising:
    at least one first resistive element in series with a first switch between a first terminal and a second terminal of application of a first DC voltage; and
    a capacitive element between a third terminal and a fourth terminal for supplying a second DC voltage smaller than the first one,
    a node between said first resistive element and the first switch being coupled by a diode to said third terminal, said first switch being turned on when the second voltage reaches an upper threshold voltage and being turned off when the second voltage reaches a lower threshold voltage, said upper and lower threshold voltages being respectively greater and less than a reference voltage of the second voltage, thereby regulating the value of the second voltage around said reference voltage,
    wherein, when the first DC voltage is applied to the first and second terminals and during steady state operation, current flows uninterrupted through the at least one first resistive element towards the second terminal when the first switch is turned on and towards the third terminal when the first switch is turned off.

2. The converter of claim 1, comprising a hysteresis comparator of the second voltage with respect to said reference voltage, an output of the comparator delivering a control signal for the first switch.

3. The converter of claim 1, wherein said first resistive element introduces a potential difference approximately corresponding to the voltage difference between the first and second voltages.

4. The converter of claim 1, wherein said first resistive element is a resistor.

5. The converter of claim 1, wherein said first resistive element is formed by the on-state drain-source resistance of a MOS transistor.

6. The converter of claim 5, wherein said transistor is a normally-on GaN transistor.

7. The converter of claim 1, wherein the first switch is controlled in either an on state or an off state.

8. The converter of claim 1, wherein said diode is formed of a second controlled switch.

9. The converter of claim 1, comprising a passive component between the switch and said second terminal.

10. The converter of claim 1, wherein the ratio of the first and second voltages is greater than 100.

11. The converter of claim 1, wherein the first voltage is greater than 1,000 volts.

12. A power conversion chain comprising the step-down converter of claim 1.

13. A method of converting a first DC voltage into a second DC voltage in a step-down converter comprising at least one first resistive element in series with a first switch between a first terminal and a second terminal of application of the first DC voltage, a capacitive e element between a third terminal and a fourth terminal for supplying the second DC voltage and a node between said first resistive element the first switch being coupled by a diode to said third terminal, wherein a charge the capacitive element is controlled by the first switch controlled by a hysteresis comparator of the second voltage with respect to a reference voltage, said first switch being turned on when the second voltage reaches an upper threshold voltage and being turned off when the second voltage reaches a lower threshold voltage, said upper and lower threshold voltages being respectively greater and less than a reference voltage of the second voltage, thereby regulating the value of the second voltage around said reference voltage, and wherein, during steady state operation, the first DC voltage causes current to flow uninterrupted through the at least one first resistive element and toward the first switch when the first switch is turned on and towards the capacitive element when the first switch is turned off.

14. The method of claim 13, wherein the first switch short-circuits the node to ground.

15. The method of claim 13, wherein a resistive element couples the first terminal of application of the first voltage to said node, said element absorbing the voltage drop between the first and second voltages.

\* \* \* \* \*